United States Patent
Lee et al.

(10) Patent No.: US 9,835,443 B2
(45) Date of Patent: Dec. 5, 2017

(54) 3D SCANNING APPARATUS AND 3D SCANNING METHOD

(71) Applicant: 3D Systems Korea, Inc., Seoul (KR)

(72) Inventors: Dong Hoon Lee, Seoul (KR); Kang Hoon Chung, Gyeonggi-do (KR)

(73) Assignee: 3D SYSTEMS KOREA, INC., Seoul (KR)

( * ) Notice: Subject to any disclaimer, the term of this patent is extended or adjusted under 35 U.S.C. 154(b) by 0 days.

(21) Appl. No.: 15/285,901

(22) Filed: Oct. 5, 2016

(65) Prior Publication Data

US 2017/0211930 A1 Jul. 27, 2017

(30) Foreign Application Priority Data

Jan. 25, 2016 (KR) .................. 10-2016-0008792

(51) Int. Cl.
*G01B 11/24* (2006.01)

(52) U.S. Cl.
CPC .................................. *G01B 11/24* (2013.01)

(58) Field of Classification Search
CPC . G01B 11/24; G01B 11/2518; G01B 11/2504; G01B 11/2522; G06T 19/00; G06T 17/00; G01C 11/025; G06K 2209/40
USPC ..................... 356/601–623; 348/39
See application file for complete search history.

(56) References Cited

U.S. PATENT DOCUMENTS

| | | | | |
|---|---|---|---|---|
| 8,848,201 B1* | 9/2014 | Bruce | .................... | G01B 11/24 356/601 |
| 2008/0246757 A1* | 10/2008 | Ito | .......................... | G06T 15/10 345/419 |
| 2009/0097039 A1* | 4/2009 | Kawasaki | .......... | G01B 11/2509 356/603 |
| 2010/0149550 A1* | 6/2010 | Diefenbacher | ...... | G01B 5/0002 356/601 |
| 2015/0172630 A1* | 6/2015 | Hsieh | .................. | G01B 21/047 348/50 |
| 2015/0336209 A1* | 11/2015 | Yamashita | .......... | B23K 26/046 219/121.75 |

* cited by examiner

*Primary Examiner* — Hoa Pham
(74) *Attorney, Agent, or Firm* — Nixon & Vanderhye P.C.

(57) ABSTRACT

Disclosed are a 3D scanning apparatus and a 3D scanning method. The 3D scanning apparatus includes a turntable which is rotatable at 360 degrees about a rotating shaft so that the target object is rotated; a 3D scanner configured to obtain 3D scan data of the target object by scanning the target object on the turntable; and a controller configured to control a rotating operation of the turntable and a scanning operation of the 3D scanner so as to rotate the turntable 360 at degrees, operate the 3D scanner to scan the target object at each of rotation angles of the turntable, and additionally measure the non-measured portion by distinguishing a non-measured portion of the target object.

11 Claims, 7 Drawing Sheets

3D SCANNING APPARATUS AND 3D SCANNING METHOD

CROSS-REFERENCE TO RELATED APPLICATION

This application claims priority to and the benefit of Korean Patent Application No. 2016-0008792, filed on Jan. 25, 2016, the disclosure of which is incorporated herein by reference in its entirety.

BACKGROUND

1. Field of the Invention

The present invention relates to a 3D scanning apparatus which measures a shape of a target object using a 3D scanner while rotating the target object.

2. Discussion of Related Art

A work of measuring an actual object and producing 3D scan data is referred to as a 3D scanning. Generally, in the 3D scanning, a target object is put on a rotatable turntable and then scanned by a 3D scanner while the turntable is rotated at a full 360 degrees, and thus 3D scan data is produced.

In Korean Patent Publication No. 10-2014-0002270, there is disclosed a jig device for a 3D scanner, which fixes a chassis component for a vehicle and enables the chassis component to be scanned while rotating the chassis component. Also, Korean Patent No. 10-1477185 discloses a 3D scanner platform and a 3D scanning apparatus having the same, in which a target object is put on the scanner platform and then three-dimensionally scanned using the scanner while rotating the scanner platform.

In the 3D scanning methods according to the above-described prior art documents, measurement data of the target object is obtained and gathered in various directions using the scanner while rotating the target object to measure the entire shape of the target object. Here, in order to obtain the complete measurement data of the target object when the target object is scanned while being rotated at 360 degrees, a rotation angle of the target object should be set very small, and the target object should be scanned in so many directions (at so many angles). However, in this case, since an amount of measured data is considerably increased and a measurement time is also increased, it was actually impossible to obtain the complete measurement data of the target object.

Therefore, when the target object is scanned using a general 3D scanning method, a portion of the target object which is not measured may occur. Therefore, an operator should check a measured result with the naked eye, should find a portion thereof necessary to be additionally measured and thus should perform an additional measurement.

SUMMARY OF THE INVENTION

The present invention is directed to a 3D scanning method which does not have to perform an additional measurement of a target object, can reduce a measurement time while accurately measuring the target object.

According to an aspect of the present invention, there is provided a 3D scanning apparatus including a turntable on which a target object is put and which is rotatable at 360 degrees about a rotating shaft so that the target object is rotated; a 3D scanner installed at a position which is spaced apart at a predetermined distance from the turntable and configured to obtain 3D scan data of the target object by scanning the target object on the turntable; and a controller configured to control a rotating operation of the turntable and a scanning operation of the 3D scanner so as to rotate the turntable at 360 degrees, operate the 3D scanner to scan the target object at each of rotation angles of the turntable, and additionally measure the non-measured portion by distinguishing a non-measured portion of the target object which is not measured by the 3D scanner.

The controller may include a scan data integration part which integrates the 3D scan data of the target object obtained from the 3D scanner; a non-measured portion distinguishing part which distinguishes the non-measured portion of the target object based on a result value from the scan data integration part; and a position correction part which obtains relative position information between the 3D scanner and the turntable and rotation angle information of the turntable and adjusts the rotation angle of the turntable with respect to the 3D scanner so as to correspond to the non-measured portion obtained from the non-measured portion distinguishing part.

The non-measured portion distinguishing part may distinguish a boundary line between a scanned portion and a non-scanned portion in the scan data and may determine, as the boundary line, one of three sides of a triangular mesh, which does not have an adjacent triangle, in the scan data.

The controller may further include a scan direction distinguishing part which calculates normal directions from the boundary lines of the non-measured portion, calculates an average direction of the normal directions, projects the boundary lines of the non-measured portion on a virtual scan data projection surface in the average direction, calculates an area formed by the boundary lines on the scan data projection surface and then sets the calculated value as an initial value, calculates a direction in which the boundary lines on the scan data projection surface have a maximum area while virtually rotating the scan data of the non-measured portion about the rotating shaft of the turntable and then sets the calculated direction as a scanning direction, and the position correction part may rotate the turntable in the scanning direction calculated by the scan direction distinguishing part, and the 3D scanner may additionally measure the target object in the scanning direction.

The controller may further include an operation completion distinguishing part which compares a set value defined by a user with a difference value between a projected area of the boundary lines calculated before the additional measurement and a projected area of the boundary lines calculated after the additional measurement and distinguishes whether the scanning operation is completed.

Additionally, the 3D scanner may be a movable scanner connected to a robot arm, and the position correction part may correct the position of the robot arm based on the scanning direction calculated by the scan direction distinguishing part.

According to another aspect of the present invention, there is provided a 3D scanning method including a) obtaining 3D scan data by scanning the target object by using a 3D scanner while rotating the turntable 360 at degrees after putting a target object on a turntable; b) integrating the 3D scan data of the target object obtained from the 3D scanner; c) distinguishing a non-measured portion of the target object by obtaining a boundary line between a scanned portion and a non-scanned portion in a result value of the integrated scan data; d) adjusting a rotation angle of the turntable with respect to the 3D scanner so as to correspond to the non-measured portion of the target object; and e) obtaining additional scan data by additionally scanning the target object by using the 3D scanner.

In the step c, the boundary line may be defined as one of three sides of a triangular mesh, which does not have an adjacent triangle, in the scan data, and, based on the boundary line, a portion at which the triangular meshes do not exist may be distinguished as the non-measured portion of the scan data.

In the step d, normal directions from the boundary lines of the non-measured portion may be calculated, an average direction of the normal directions may be calculated, the boundary lines of the non-measured portion may be projected on a virtual scan data projection surface in the average direction, an area formed by the boundary lines on the scan data projection surface may be calculated, the calculated value may be set as an initial value, a direction in which the boundary lines on the scan data projection surface have a maximum area may be obtained while the scan data of the non-measured portion is virtually rotated about the rotating shaft of the turntable, the obtained direction may be set as a scanning direction, and the turntable may be rotated in the set scanning direction.

The 3D scanning method may further include comparing a set value defined by a user with a difference value between a projected area of the boundary lines calculated before the additional measurement of the step e and a projected area of the boundary lines calculated after the additional measurement of the step e, and as a compared result, when the difference value is less than the set value, it may be determined that the scanning operation is completed, and when the difference value is the same as or more than the set value, the step e may be additionally performed.

Additionally, the 3D scanner may be a movable scanner connected to a robot arm, and in the step d, the position correction part may correct the position of the robot arm based on the scanning direction calculated by the scan direction distinguishing part.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
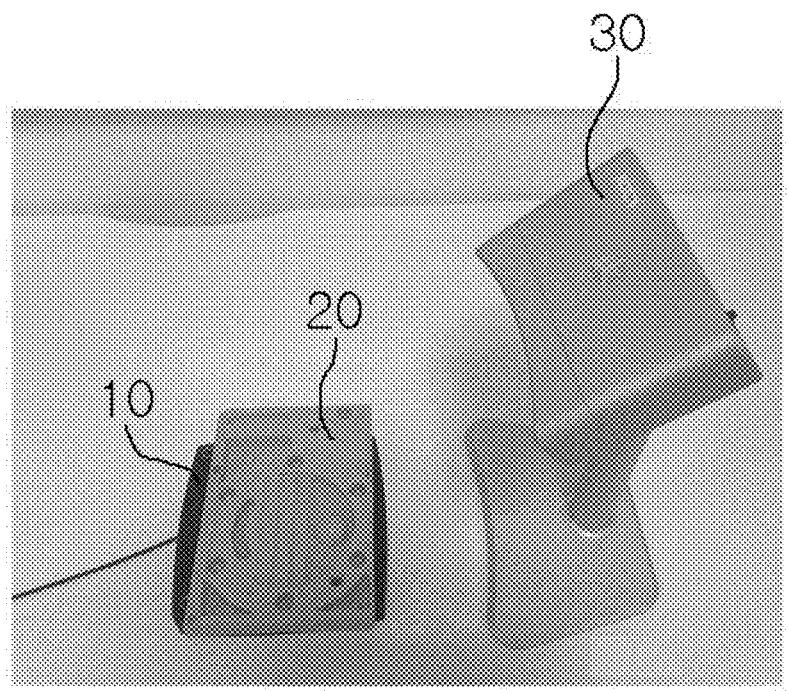
FIG. 1 is a view exemplarily illustrating a 3D scanning apparatus according to the present invention.
Figure 2:
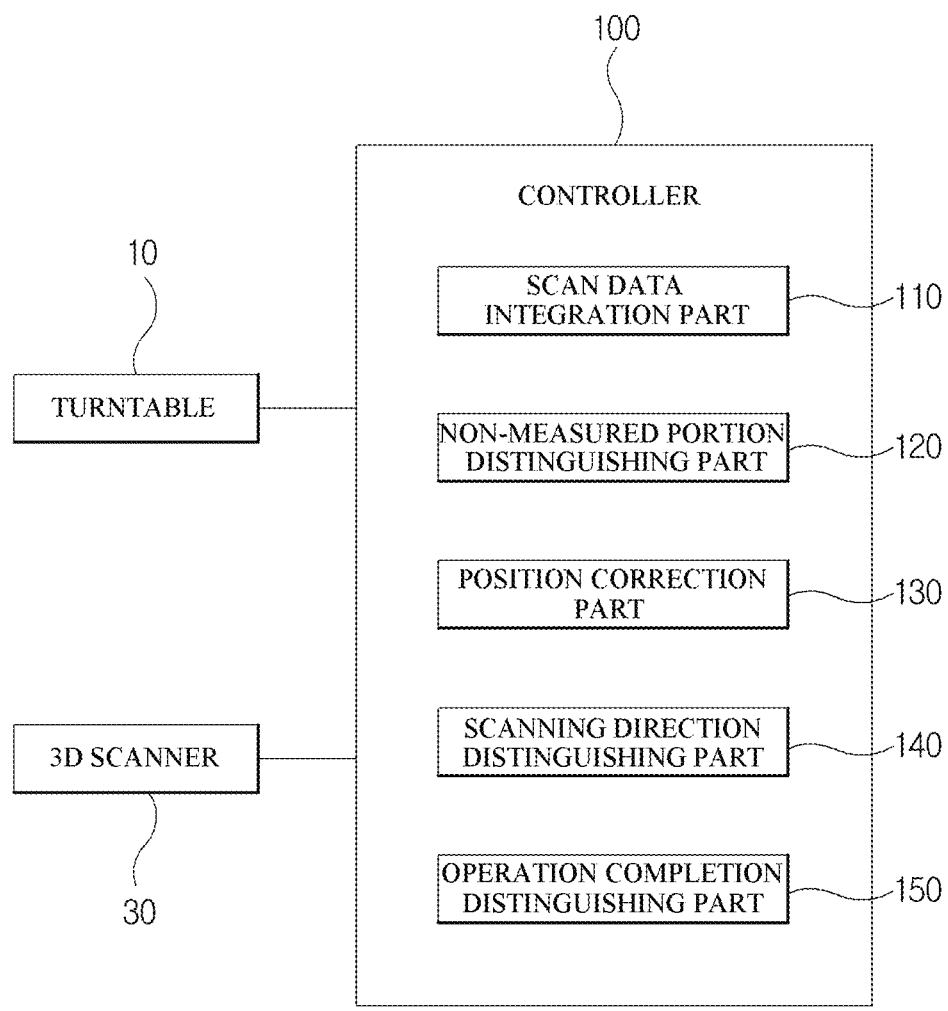
FIG. 2 is a block diagram schematically illustrating a configuration of the 3D scanning apparatus according to the present invention.
Figure 3:
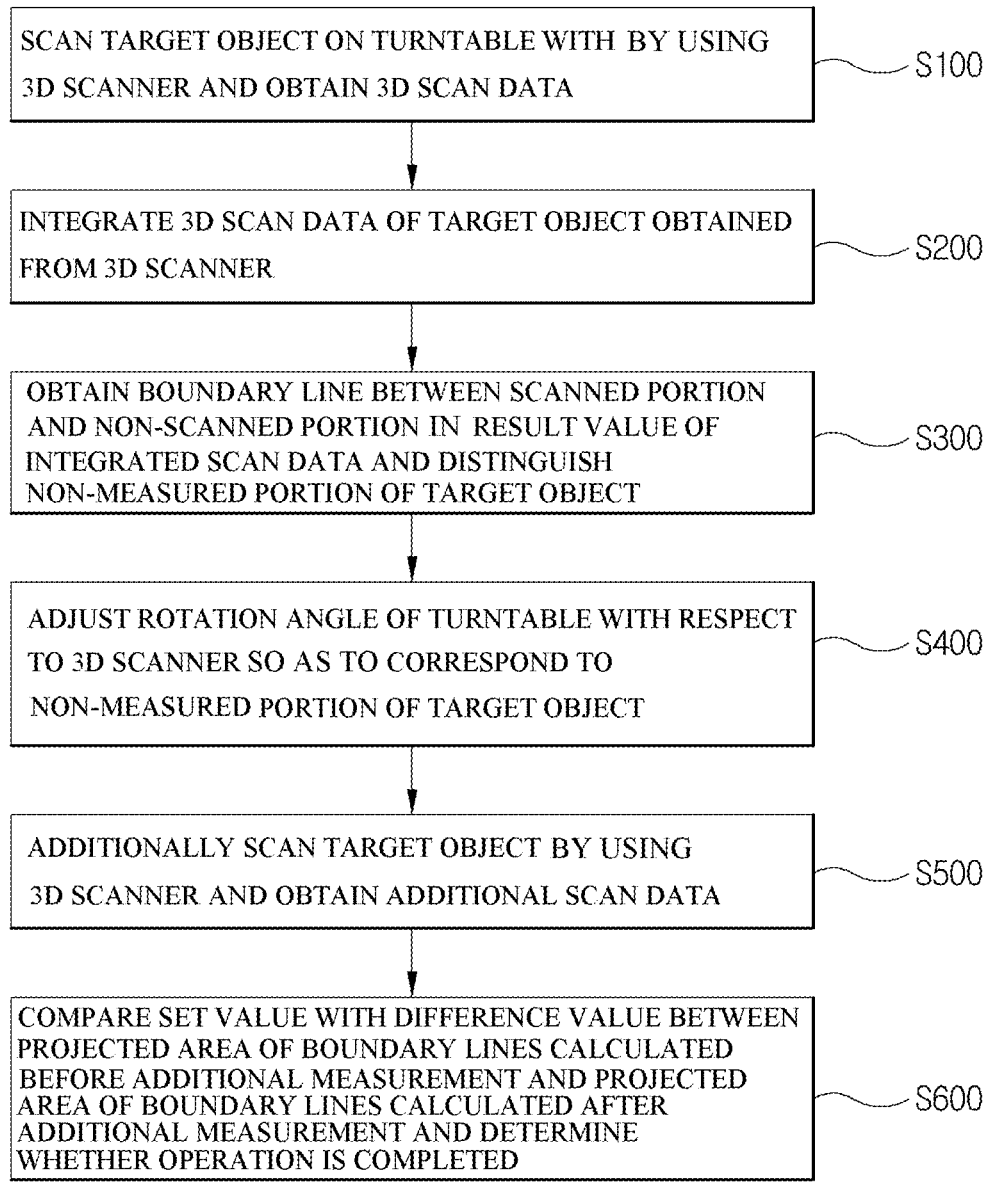
FIG. 3 is a flowchart schematically illustrating a series of stages in a 3D scanning method according to the present invention.

Referring to FIGS. 1 to 2, a 3D scanning apparatus according to the present invention includes a turntable 10 on which a target object 20 is put, a 3D scanner 30 which scans the target object 20 on the turntable 10, and a controller 100 which controls the operation of the turntable 10 and the 3D scanner 30.

The turntable 10 has a flat support on which the target object 20 is put, and the support is configured to be rotated at 360 degrees about a rotating shaft. Also, instead of the turntable 10, a multi-axial device such as a pan tilt unit may be used to support the target object 20.

The 3D scanner 30 is installed at a position which is spaced apart at a predetermined distance from the turntable 10 and scans the target object 20 put on the support provided on the turntable 10, thereby obtaining 3D scan data of the target object 20. Here, the 3D scanner 30 may be a stationary scanner which is fixed to a position which is spaced apart at a predetermined distance from the turntable 10. Alternatively, the 3D scanner 30 may be a movable scanner which is installed at a movable robot arm spaced apart at a predetermined distance from the turntable 10.

The controller 100 may be configured as a computing device including processors which perform a series of processes for scanning the target object 20. The computing device may be a workstation, a server, a laptop, a mainframe, a PDA, a cluster, a virtual device or another computing device, which may support the processors.

Here, the controller 100 controls the rotating operation of the turntable 10 and the scanning operation of the 3D scanner 30. When the scanning operation starts, the controller 100 rotates the turntable 10 at 360 degrees. At the same time, the controller 100 controls the operation of the 3D scanner 30 to scan the target object 20 at each of rotation angles of the turntable 10. For example, the 3D scanner 30 may scan the target object 20 whenever the turntable 10 is rotated at every 10 degrees and thus may obtain total 36 scan data.

Also, the controller 100 distinguishes a non-measured portion of the target object 20 which is not measured and then controls the rotating operation of the turntable 10 and the scanning operation of the 3D scanner 30 to additionally measure or scan the non-measured portion based on the distinguished result. That is, the 3D scanning apparatus according to the present invention may obtain accurate 3D scan data by measuring the entire shape of the target object 20 while rotating the target object 20 at 360 degrees, and then finding the non-measured portion and performing the additional measurement.

Specifically, the controller 100 includes a scan data integration part 110, a non-measured portion distinguishing part 120, a position correction part 130, a scan direction distinguishing part 140 and an operation completion distinguishing part 150.

The scan data integration part 110 serves to integrate the 3D scan data of the target object 20 obtained from the 3D scanner 30, and obtain the scan data which indicates the entire shape of the target object 20. The method of integrating the scan data may be one of well-known data integration methods.

The non-measured portion distinguishing part 120 distinguishes the non-measured portion of the target object 20, i.e., a portion thereof which is not scanned, based on a result value obtained from the scan data integration part 110, i.e., the scan data for the entire shape of the target object 20.

Figure 4A:
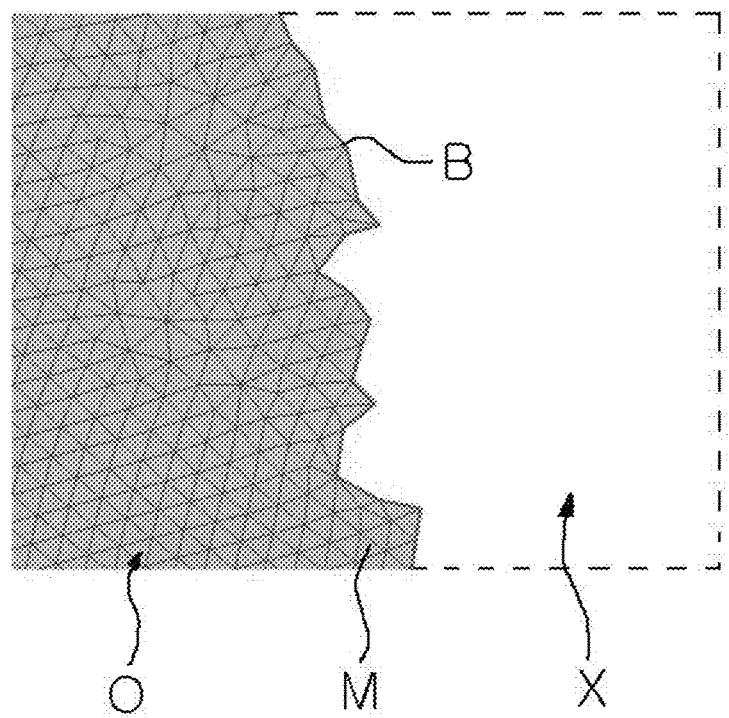
FIGS. 4a to 4g are views schematized to explain processes of the 3D scanning method according to the present invention.

Here, the non-measured portion distinguishing part 120 distinguishes a boundary line B (refer to FIG. 4a) between a scanned portion and a non-scanned portion in scan data integrated by the scan data integration part 110. At this point, in the integrated scan data, data of the scanned portion is indicated by a collection of triangular meshes M, and the non-scanned portion is indicated by an empty space. Also, the non-measured portion distinguishing part 120 determines, as the boundary line B, one of three sides of a triangular mesh, which does not have an adjacent triangle, in the scan data.

Therefore, the non-measured portion distinguishing part 120 determines a portion at which the triangular meshes M exist as the scanned portion (O) and determines a portion at which the triangular meshes M do not exist as the non-scanned portion (X) based on the boundary line B.

The position correction part 130 obtains relative position information between the 3D scanner 30 and the turntable 10 and rotation angle information of the turntable 10. The relative position information and the rotation angle information are used to align the scanned data in a coordinate space. Here, the relative position information between the 3D scanner 30 and the turntable 10 may be obtained through a well-known method such as calibration.

Also, the position correction part 130 adjusts the rotation angle of the turntable 10 with respect to the 3D scanner 30 so as to correspond to the non-measured portion obtained from the non-measured portion distinguishing part 120. That is, the position correction part 130 adjusts the rotation angle of the turntable 10 so that the 3D scanner 30 is directed to the non-measured portion of the target object 20.

Figure 4B:
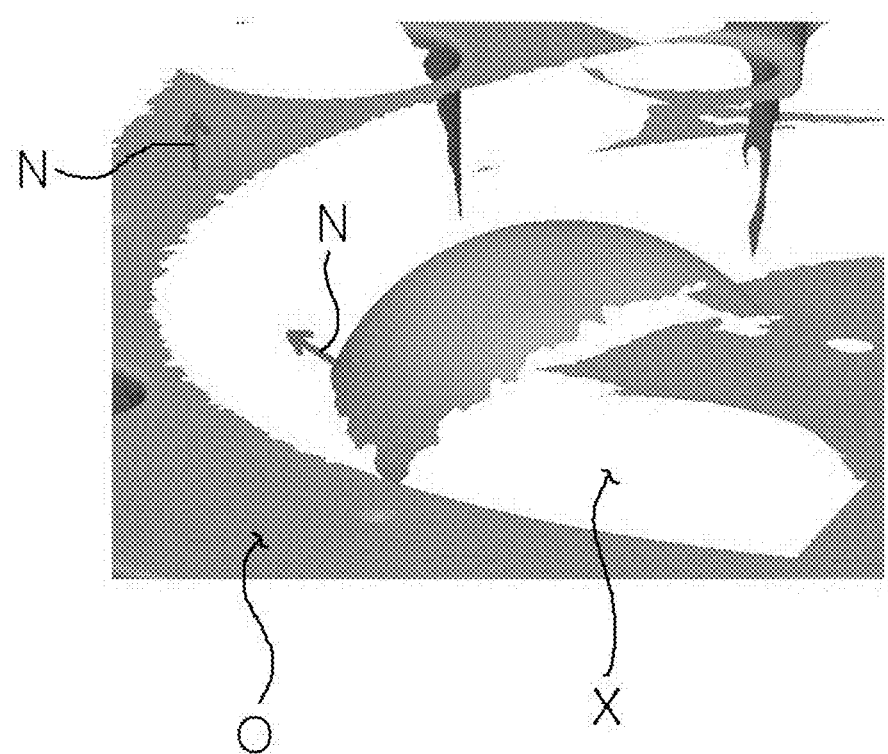

The scan direction distinguishing part 140 calculates normal directions N from the boundary line B of the non-measured portion (X) of the scan data obtained by the non-measured portion distinguishing part 120. Referring to FIG. 4b, each of the normal directions N is indicated by an arrow and defined as a direction which is directed from a certain position of the scan data toward an outside of the target object 20. Also, the scan direction distinguishing part 140 calculates the average direction of the normal directions N.

Figure 4C:
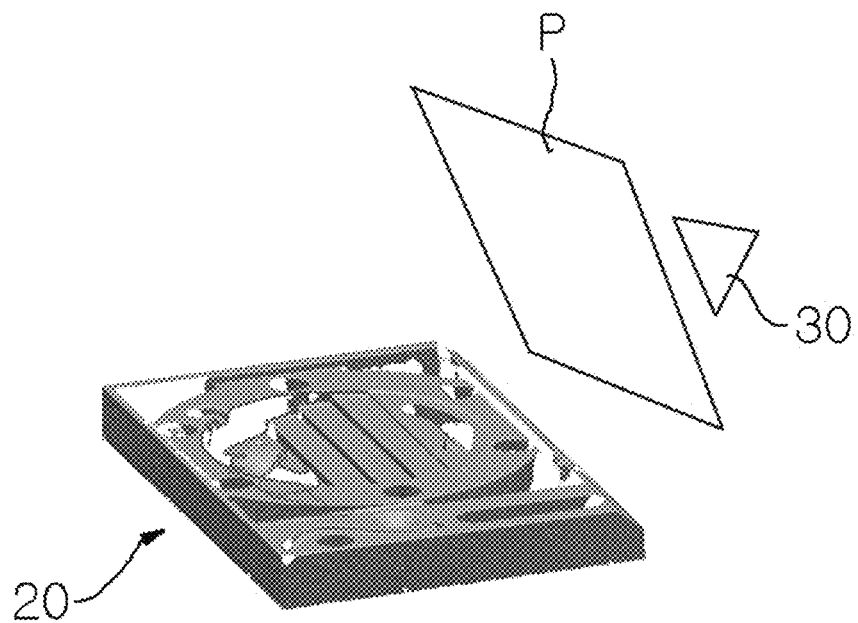
Figure 4D:
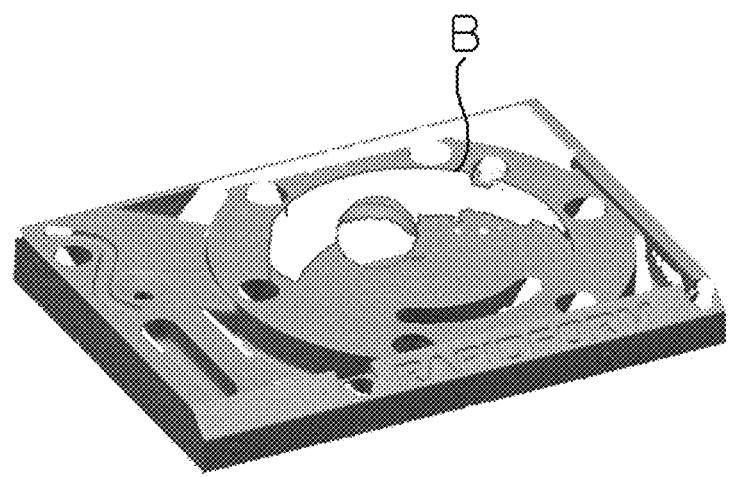

And referring to FIG. 4c, the scan direction distinguishing part 140 projects the boundary lines B of the non-measured portion (X) on a virtual scan data projection surface P in the average direction of the normal directions N, calculates an area (an area of the non-measured portion) formed by the boundary lines B on the virtual scan data projection surface P and then sets the calculated value as an initial value. That is, on an assumption that the average direction of the normal directions N from a scanned portion based on information (boundary line information) of the non-measured portion (X) distinguished by the non-measured portion distinguishing part 120 is a direction in which the 3D scanner may be located, the scan direction distinguishing part 140 sets the virtual scan data projection surface P between the virtual 3D scanner 30 and the target object 20 and then calculates the area formed by the boundary lines of the scan data projected on the scan data projection surface P. In FIG. 4c, the target objected designated by a reference numeral 20 is not an actual object but is an object which is schematized by the scanned data. FIG. 4d illustrates a state in which the scan data is projected on the virtual scan data projection surface, and the area formed by the boundary line B is a desired value.

Figure 4E:
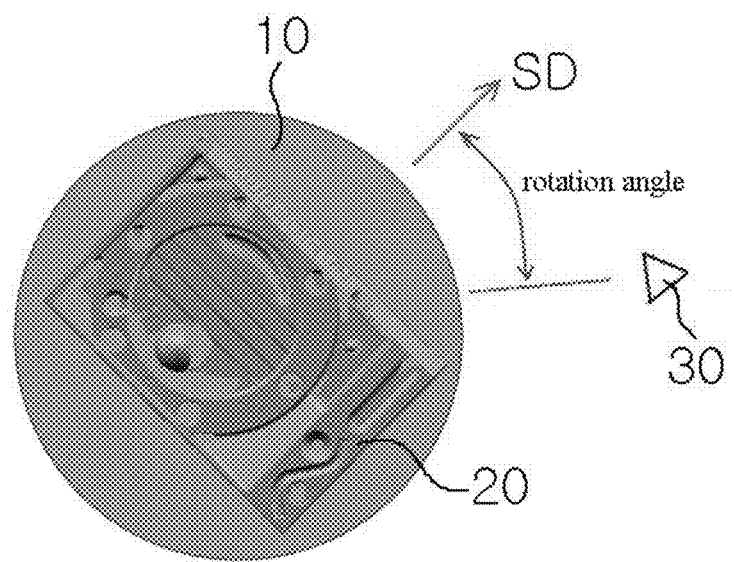

Also, the scan direction distinguishing part 140 calculates a direction in which the boundary lines B on the scan data projection surface P have a maximum area while virtually rotating the scan data of the non-measured portion (X) about the rotating shaft of the turntable 10 and then sets the calculated direction as a scanning direction SD. When the scanning direction SD is set, the position correction part 130 rotates the turntable 10 in the scanning direction SD set by the scan direction distinguishing part 140 (referring to FIG. 4e), and the 3D scanner 30 additionally measures the target object 20 in the scanning direction.

Additionally, when the 3D scanner 30 is the movable scanner connected to the robot arm, the position correction part 130 corrects a position of the robot arm based on the scanning direction SD calculated by the scan direction distinguishing part 140. In this state, the 3D scanner 30 may additionally measure the target object 20.

The operation completion distinguishing part 150 compares a set value defined in advance by a user with a difference value between the projected area of the boundary lines of the non-measured portion calculated before the additional measurement of the 3D scanner 30 and the projected area of the boundary lines of the non-measured portion calculated after the additional measurement of the 3D scanner 30 and distinguishes whether a scanning operation is completed. Here, the operation completion distinguishing part 150, when the difference value is less than the set value, determines that the scanning operation is completed and, when the difference value is the same as or more than the set value, enables the additional scanning operation to be performed.

As described above, the 3D scanning apparatus according to the present invention may find the non-measured portion of the target object, may perform a series of processes for additionally measuring the non-measured portion and thus may perform an accurate measurement in a short time.

Hereinafter, a 3D scanning method according to the present invention will be described with reference to the accompanying drawings.

First, when the target object 20 is put on the turntable 10 and then the scanning operation starts, the controller 100 scans the target object 20 by using the 3D scanner 30 while rotating the turntable 10 at 360 degrees and obtains the 3D scan data of the target object (S100). Here, the scanning operation of the 3D scanner 30 and the rotating operation of the turntable 10 are controlled by the controller 100, and the 3D scanner 30 scans the target object 20 at each of the rotation angles of the turntable 10 and obtains multiple 3D scan data.

And, the scan data integration part 110 of the controller 100 integrates the 3D scan data of the target object 20 obtained from the 3D scanner 30 and obtains the scan data for the entire shape of the target object 20 (S200).

Then, the non-measured portion distinguishing part 120 of the controller 100 obtains the boundary line B between the scanned portion (O) and the non-scanned portion (X) in the result value obtained from the scan data integration part 110, and distinguishes the non-measured portion of the target object 20 (S300). That is, the non-measured portion distinguishing part 120 distinguishes the non-measured portion (X) of the target object 20, i.e., the portion which is not scanned, based on the scan data for the entire shape of the target object 20.

Here, the non-measured portion distinguishing part 120 distinguishes the boundary line B between the scanned portion and the non-scanned portion in the scan data integrated by the scan data integration part 110. At this point, in the integrated scan data, data of the scanned portion (O) is indicated by the collection of the triangular meshes M, and the non-scanned portion (X) is indicated by the empty space. Here, the non-measured portion distinguishing part 120 determines, as boundary line B, one of a three sides of a triangular mesh, which does not have an adjacent triangle, in the scan data. Therefore, the non-measured portion distinguishing part 120 determines the portion at which the triangular meshes M exist as the scanned portion (O) and determines the portion at which the triangular meshes M do not exist as the non-measured portion (X) based on the boundary line B.

When the non-measured portion (X) of the target object 20 is distinguished by the non-measured portion distinguishing part 120, the position correction part 130 of the controller 100 adjusts the rotation angle of the turntable 10 with respect to the 3D scanner 30 so as to correspond to the non-measured portion (X) of the target object 20 (S400). That is, the position correction part 130 adjusts the rotation angle of the turntable 10 so that the 3D scanner 30 is directed to the non-measured portion (X) of the target object 20.

At this point, the scan direction distinguishing part 140 projects the boundary lines B of the non-measured portion (X) on the virtual scan data projection surface P in the average direction of the normal directions N, calculates an area (an area of the non-measured portion) formed by the boundary lines B on the scan data projection surface P and then sets the calculated value as an initial value. That is, on the assumption that the average direction of the normal directions N from a scanned portion based on information (boundary line information) of the non-measured portion (X) distinguished by the non-measured portion distinguishing part 120 is the direction in which the 3D scanner may be located, the scan direction distinguishing part 140 sets the virtual scan data projection surface P between the virtual 3D scanner 30 and the target object 20 and then calculates an area formed by the boundary lines of the scan data projected on the scan data projection surface P.

Also, the scan direction distinguishing part 140 calculates the direction in which the boundary lines B on the scan data projection surface P have a maximum area while virtually rotating the scan data of the non-measured portion (X) about the rotating shaft of the turntable 10 and then sets the calculated direction as a scanning direction SD. When the scanning direction SD is set, the position correction part 130 rotates the turntable 10 in the scanning direction SD set by the scan direction distinguishing part 140.

Then, the controller 100 additionally scans the target object 30 by using the 3D scanner 30 and obtains the additional scan data (S500). At this point, the 3D scanner 30 additionally measures the target object 20 in the scanning direction SD set by the scan direction distinguishing part 140.

Figure 4F:
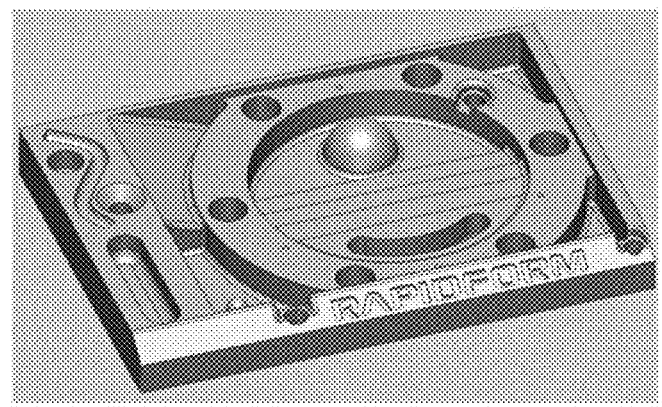
Figure 4G:
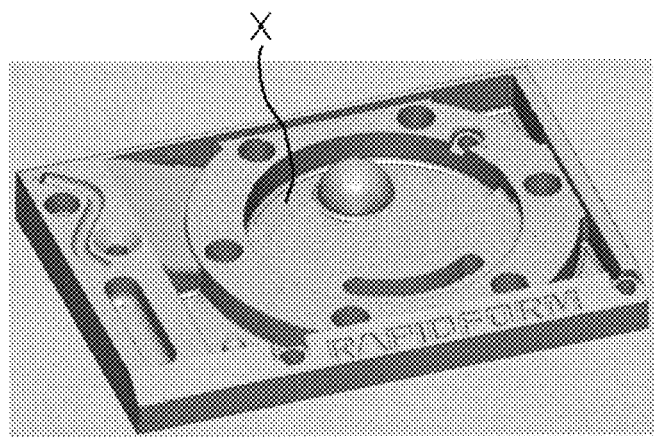

Meanwhile, when there is CAD data for the target object to be scanned, the non-measured portion of the scan data may be distinguished during the scanning operation by using the corresponding CAD data. FIG. 4*f* illustrates the CAD data, and FIG. 4*g* illustrates a state in which the obtained scan data is overlapped with the CAD data. In FIG. 4*g*, an area designated by a reference numeral X corresponds to the non-measured portion in which the scan data does not exist. An initial value of scanning direction is calculated with an average value of the normal directions of the CAD data portion corresponding to the non-measured portion (X), and a direction in which an area projected on the scan data projection surface becomes maximum is obtained therefrom, and then the scanning direction is set. And when the average value of the normal directions of the CAD data portion is calculated, considering an area of an element of the corresponding portion, the element having a wide area is allowed to haves more effect on the average value of the normal directions, and thus making the scanning direction of the non-measured portion obtained.

The 3D scanning method according to the present invention further includes a step of determining whether the scanning operation is completed (S600). Specifically, in this step, the operation completion distinguishing part 150 of the controller 100 compares a set value defined in advance by the user with the difference value between the projected area of the boundary lines calculated before the additional measurement of the step S500 and the projected area of the boundary lines calculated after the additional measurement of the step S500. And, the operation completion distinguishing part 150, when the difference value is less than the set value, determines that the scanning operation is completed and, when the difference value is the same as or more than the set value, controls the operation of the turntable 10 and the 3D scanner 30 to enable the step S500 to be additionally performed.

Additionally, when the 3D scanner 30 is a movable scanner connected to the robot arm, in the step S400, the position correction part 130 corrects the position of the robot arm based on the scanning direction SD calculated by the scan direction distinguishing part 140. In this state, the 3D scanner 30 may additionally measure the target object 20.

According to the present invention, a series of processes for finding the non-measured portion of the target object and additionally measuring the non-measured portion can be automatically performed, and thus the target object can be accurately scanned in a short time.

It will be apparent to those skilled in the art that various modifications can be made to the above-described exemplary embodiments of the present invention without departing from the spirit or scope of the invention. Thus, it is intended that the present invention covers all such modifications provided they fall within the scope of the appended claims and their equivalents.

What is claimed is:

1. A 3D scanning apparatus comprising:
a turntable on which a target object is put and which is rotatable at 360 degrees about a rotating shaft so that the target object is rotated;
a 3D scanner installed at a position which is spaced apart at a predetermined distance from the turntable and configured to obtain 3D scan data of the target object by scanning the target object on the turntable; and
a controller configured to control a rotating operation of the turntable and a scanning operation of the 3D scanner so as to rotate the turntable at 360 degrees, operate the 3D scanner to scan the target object at each of rotation angles of the turntable, and additionally measure the non-measured portion by distinguishing a non-measured portion of the target object which is not measured by the 3D scanner.

2. The 3D scanning apparatus of claim 1, wherein the controller comprises:
a scan data integration part which integrates the 3D scan data of the target object obtained from the 3D scanner;
a non-measured portion distinguishing part which distinguishes the non-measured portion of the target object based on a result value from the scan data integration part; and
a position correction part which obtains relative position information between the 3D scanner and the turntable and rotation angle information of the turntable and adjusts the rotation angle of the turntable with respect to the 3D scanner so as to correspond to the non-measured portion obtained from the non-measured portion distinguishing part.

3. The 3D scanning apparatus of claim 2, wherein the non-measured portion distinguishing part distinguishes a boundary line between a scanned portion and a non-scanned portion in the scan data and determines, as the boundary line, one of three sides of a triangular mesh, which does not have an adjacent triangle, in the scan data.

4. The 3D scanning apparatus of claim 3, wherein the controller further comprises a scan direction distinguishing part which calculates normal directions from the boundary lines of the non-measured portion, calculates an average direction of the normal directions, projects the boundary lines of the non-measured portion on a virtual scan data projection surface in the average direction, calculates an area formed by the boundary lines on the scan data projection surface and then sets the calculated value as an initial value, calculates a direction in which the boundary lines on the scan data projection surface have a maximum area while virtually rotating the scan data of the non-measured portion about the rotating shaft of the turntable and then sets the calculated direction as a scanning direction, and
the position correction part rotates the turntable in the scanning direction calculated by the scan direction distinguishing part, and the 3D scanner additionally measures the target object in the scanning direction.

5. The 3D scanning apparatus of claim 4, wherein the controller further comprises an operation completion distinguishing part which compares a set value defined by a user with a difference value between a projected area of the boundary lines calculated before the additional measurement and a projected area of the boundary lines calculated after the additional measurement and distinguishes whether the scanning operation is completed.

6. The 3D scanning apparatus of claim 4, wherein the 3D scanner is a movable scanner connected to a robot arm, and the position correction part corrects the position of the robot arm based on the scanning direction calculated by the scan direction distinguishing part.

7. A 3D scanning method comprising:
a) obtaining 3D scan data by scanning the target object by using a 3D scanner while rotating a turntable at 360 degrees after putting a target object on the turntable;
b) integrating the 3D scan data of the target object obtained from the 3D scanner;
c) distinguishing a non-measured portion of the target object by obtaining a boundary line between a scanned portion and a non-scanned portion in a result value of the integrated scan data;
d) adjusting a rotation angle of the turntable with respect to the 3D scanner so as to correspond to the non-measured portion of the target object; and
e) obtaining additional scan data by additionally scanning the target object by using the 3D scanner.

8. The 3D scanning method of claim 7, wherein, in the step c, the boundary line is defined as one of three sides of a triangular mesh, which does not have an adjacent triangle, in the scan data, and, based on the boundary line, a portion at which the triangular meshes do not exist is distinguished as the non-measured portion of the scan data.

9. The 3D scanning method of claim 8, wherein, in the step d, normal directions from the boundary lines of the non-measured portion are calculated, an average direction of the normal directions is calculated, the boundary lines of the non-measured portion are projected on a virtual scan data projection surface in the average direction, an area formed by the boundary lines on the scan data projection surface is calculated, the calculated value is set as an initial value, a direction in which the boundary lines on the scan data projection surface have a maximum area is obtained while the scan data of the non-measured portion is virtually rotated about the rotating shaft of the turntable, the obtained direction is set as a scanning direction, and the turntable is rotated in the set scanning direction.

10. The 3D scanning method of claim 9, further comprising comparing a set value defined by a user with a difference value between a projected area of the boundary lines calculated before the additional measurement of the step e and a projected area of the boundary lines calculated after the additional measurement of the step e,
wherein, as a compared result, when the difference value is less than the set value, it is determined that the scanning operation is completed, and when the difference value is the same as or more than the set value, the step e is additionally performed.

11. The 3D scanning method of claim 9, wherein the 3D scanner is a movable scanner connected to a robot arm, and in the step d, the position correction part corrects the position of the robot arm based on the scanning direction calculated by the scan direction distinguishing part.

\* \* \* \* \*